United States Patent
Fuchs et al.

(10) Patent No.: US 9,145,774 B2
(45) Date of Patent: Sep. 29, 2015

(54) METHOD FOR COOLING A GAS TURBINE PLANT AND GAS TURBINE PLANT FOR IMPLEMENTING THE METHOD

(75) Inventors: Herbert Fuchs, Nussbaumen (CH); Anton Nemet, Lengnau (CH); Hans Wettstein, Fislisbach (CH)

(73) Assignee: ALSTOM TECHNOLOGY LTD., Baden (CH)

( * ) Notice: Subject to any disclaimer, the term of this patent is extended or adjusted under 35 U.S.C. 154(b) by 0 days.

(21) Appl. No.: 13/526,324

(22) Filed: Jun. 18, 2012

(65) Prior Publication Data

US 2013/0036747 A1 Feb. 14, 2013

(30) Foreign Application Priority Data

Jun. 16, 2011 (CH) ..................................... 1017/11

(51) Int. Cl.
*F01D 5/18* (2006.01)
*F02C 7/18* (2006.01)

(52) U.S. Cl.
CPC .............. *F01D 5/187* (2013.01); *F02C 7/185* (2013.01); *F05D 2260/202* (2013.01); *F05D 2260/205* (2013.01)

(58) Field of Classification Search
CPC ........ F01D 5/187; F02C 7/185; F02C 7/1435; F02C 7/18; F02C 7/143; F02C 6/08; F02C 3/305; Y02T 50/675; Y02T 50/676
USPC .............. 60/782, 785, 39.53, 39.59, 728, 806
See application file for complete search history.

(56) References Cited

U.S. PATENT DOCUMENTS

| | | | |
|---|---|---|---|
| 2,647,368 A * | 8/1953 | Triebbnigg et al. | ............. 60/775 |
| 5,120,192 A | 6/1992 | Ohtomo et al. | |
| 5,122,033 A | 6/1992 | Paul | |
| 5,611,197 A | 3/1997 | Bunker | |
| 6,012,279 A | 1/2000 | Hines | |

(Continued)

FOREIGN PATENT DOCUMENTS

| DE | 10027833 A1 | 12/2001 |
|---|---|---|
| EP | 0 392 664 A2 | 10/1990 |

(Continued)

OTHER PUBLICATIONS

German Office Action dated Apr. 30, 2013; statement of relevance; search report issued in corresponding German Patent Application No. 10 2012 011 294.7 (6 pgs.).

(Continued)

*Primary Examiner* — Gerald L Sung
*Assistant Examiner* — Scott Walthour
(74) *Attorney, Agent, or Firm* — Buchanan Ingersoll & Rooney PC (57) ABSTRACT

A method is provided for operating a gas turbine plant, in which compressed air is extracted from a compressor and for cooling is directed in an internal cooling passage through thermally loaded components to the combustion chamber and/or to the turbine, then re-cooled, and added to the compressor main flow in the compressor. At least a portion of the recirculated air is supersaturated, or partially saturated, with drops of water during or before recirculation into the compressor and a cooling mist is created. A gas turbine plant is provided with a closed cooling circuit which, for implementing the method, includes an injection arrangement for introducing water into the recirculated cooling air.

10 Claims, 4 Drawing Sheets

(56) References Cited

U.S. PATENT DOCUMENTS

| | | | |
|---|---|---|---|
| 6,033,181 A | 3/2000 | Endres et al. | |
| 6,098,395 A | 8/2000 | North | |
| 6,470,668 B2 | 10/2002 | Payling et al. | |
| 6,532,744 B1 | 3/2003 | Reiter et al. | |
| 7,033,135 B2 * | 4/2006 | Mortzheim et al. | 415/115 |
| 7,104,750 B2 * | 9/2006 | Bolis et al. | 415/116 |
| 7,263,834 B2 | 9/2007 | Reiter et al. | |
| 7,555,892 B2 * | 7/2009 | Vosberg | 60/39.53 |
| 2004/0206064 A1 | 10/2004 | Reiter et al. | |
| 2008/0112794 A1 | 5/2008 | Lee et al. | |

FOREIGN PATENT DOCUMENTS

| | | |
|---|---|---|
| EP | 0 899 425 A2 | 3/1999 |
| EP | 1 162 355 A2 | 12/2001 |
| EP | 1 167 721 A2 | 1/2002 |
| EP | 1 921 270 A2 | 5/2008 |
| WO | WO 97/38219 A1 | 10/1997 |

OTHER PUBLICATIONS

Switzerland Search Report for CH 10172011 dated Dec. 21, 2011.

* cited by examiner

METHOD FOR COOLING A GAS TURBINE PLANT AND GAS TURBINE PLANT FOR IMPLEMENTING THE METHOD

RELATED APPLICATIONS

This application claims priority under 35 U.S.C. §119 to Swiss Patent Application No. 01017/11 filed in Europe on Jun. 16, 2011, the entire content of which is hereby incorporated by reference in its entirety.

FIELD

The present disclosure relates to the field of gas turbines. More particularly, the present disclosure relates to a method for cooling a gas turbine, and to a gas turbine plant for implementing the method.

BACKGROUND INFORMATION

Gas turbines (gas turbine plants), for cooling of the hot parts, especially the combustion chamber and the turbine through which flows the hot gas, use either cooling fluids, which are extracted from the compressor at a suitable pressure, are sometimes also additionally aftercooled, and, after cooling of the hot parts has been carried out, are added to the turbine flow, or closed cooling circuits which are supplied from an external cooling fluid source, in most cases with steam. In the latter cases, which are frequently to be found in combined cycle power plants, the cooling heat can often be additionally utilized in the downstream process. A further possibility, which is described in EP 0899425, for example, particularly in the case of blade cooling, combines a closed steam cooling system in the main part of the blade with an open cooling system in the region of the blade leading edge.

A gas turbine with a closed cooling system for the stator blades and rotor blades and also for the hot gas casing of the turbine has been proposed in U.S. Pat. No. 5,611,197, in which air at a specified pressure is extracted from the compressor at an intermediate pressure stage or at the exit, guided as cooling air through the components which are to be cooled, and then fed again at a suitable lower pressure stage into the compressor. The recirculated cooling air in this case can also be additionally cooled in a cooler before being fed into the compressor.

Also, a gas turbine with a partially closed cooling system is known from U.S. Pat. No. 7,263,834, in which a portion of the cooling air is used for the film cooling of the component surfaces which are exposed to the hot gas, and an additional portion of the cooling air is recirculated into the compressor.

For increasing power, water injection for intercooling between a low-pressure compressor and a high-pressure compressor is known from U.S. Pat. No. 6,012,279.

The addition of cooling air leads to mixing losses in the compressor and the water injection leads to mixing losses and increased overall length.

SUMMARY

An exemplary embodiment of the present disclosure provides a method for cooling a gas turbine plant. The gas turbine plant includes a compressor configured to suck in air on an inlet side of the compressor, compress the air and discharge the compressed air from a discharge side of the compressor, a combustion chamber configured to combust the compressed air to form a hot gas and a turbine configured to expand the hot gas to perform work. The exemplary method includes extracting the compressed air from the compressor and directing the extracted compressed air in an internal cooling passage through thermally loaded components of at least one of the combustion chamber and the turbine. The exemplary method also includes re-cooling the extracted compressed air directed through the internal cooling passage and recirculating the re-cooled air to a compressor main flow in the compressor. At least a portion of the recooled air is supersaturated or partially saturated with drops of water during or before the recirculation into the compressor and a cooling mist is created.

An exemplary embodiment of the present disclosure provides a gas turbine plant. The exemplary gas turbine plant includes: a compressor configured to suck in intake air on an inlet side of the compressor, compressed the air to form compressed air and discharge the compressed air on a discharge side of the compressor; a combustion chamber configured to combust the compressed air to form a hot gas; at least one turbine configured to expand the hot gas to perform work; first cooling lines configured to cool thermally loaded components of at least one of the combustion chamber and the turbine by recirculating cooling air to the thermally loaded components, the first cooling lines being connected to an exit of the compressor to the thermally loaded components; second cooling lines connected from the thermally loaded components back to the compressor; at least one of a first cooler arranged in the first cooling lines and a second cooler arranged in the second cooling lines; and an injection arrangement configured to introduce water into the recirculated cooling air.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a cooling method for a gas turbine plant and also a gas turbine plant for implementing the method, which avoid the disadvantages of known methods or of gas turbine plants. The exemplary embodiments of the present disclosure, in contrast to known techniques, provide high cooling efficiency with a simultaneously simple construction and operation and high overall efficiency of the plant.

Exemplary embodiments of the present disclosure provide for loading the recooled cooling air with drops of water before or during the recirculation into the compressor in order to therefore combine the recirculation into the compressor with an additional intercooling effect in the compressor. As a result of the intercooling in the compressor, the compression effort is reduced. For example, the compressor load reduces and the overall output and the efficiency of the gas turbine plant increase accordingly. Moreover, as a result of the combined introduction of recirculated air and drops of water, the mixing losses are reduced and at the same time the effect is increased so that better overall efficiency and higher output can be achieved.

An exemplary embodiment of the present disclosure provides for cooling a gas turbine plant. The gas turbine plant includes a compressor, which on the inlet side sucks in intake air and compresses it to form compressor exit air which is available on the discharge side, at least one combustion chamber, in which by utilizing the compressor exit air a fuel is combusted, forming hot gas, and at least one turbine, in which the hot gas is expanded, performing work. In accordance with an exemplary embodiment of the present disclosure, compressed or partially compressed cooling air is extracted from the compressor. The extracted cooling air is directed in an internal cooling passage through thermally loaded components of the combustion chamber and/or of the turbine for cooling. The extracted cooling air is then recooled and added to the compressor main flow again in the compressor upstream of the cooling air tapping. Before or during the recirculation into the compressor main flow, at least a portion of the recooled air is supersaturated or partially saturated with drops of water during or before the recirculation into the compressor.

An exemplary embodiment of the present disclosure provides that drops of water are created as a result of atomization in nozzles or high-pressure nozzles during the injection of water into the recirculated air. With high-pressure nozzles, small drop sizes can be achieved. In order to ensure fast evaporation of the drops after entry into the compressor flow and therefore to achieve the advantageous intercooling effect, the drops should be as small as possible. The average size (measured as the sauter mean diameter, for example) of the water droplets may be less than 75 µm, for example, less than 50 µm or even less than 30 µm, for example 25 µm.

According to an exemplary embodiment of the present disclosure, the water is injected via nozzles or high-pressure nozzles at a temperature which lies above the ebullition temperature of the water after injection so that during injection into the recirculated cooling air ebullition bubbles are created in the water droplets or in the water film as a consequence of the pressure drop across the nozzles (also referred to as atomizers), which lead to an explosion-like size-reduction of the droplets or of the film. The water may be preheated in order to bring it above the ebullition temperature, but hot water at a high pressure level from a water-steam cycle, for example, can also be used.

This so-called "flashing" leads to the explosion or size-reduction of the droplets or of the film as a consequence of the sudden partial ebullition. Such a size-reduction leads to the creation of very small water droplets in the gaseous medium. After size-reduction, the average size of the water droplets is less than 5 µm, generally less than 3 µm, for example, less than 2 µm, such as 1.2 µm. This means that atomizers can be used in the atomizing devices if, after size-reduction, they lead to droplets of the stated average size. In this context, it is of importance that the atomization devices, especially the flash atomization units, are fastened and arranged in such a way that the drops of water are further reduced in size as a result of the formation of vapor in said drops of water.

In accordance with an exemplary embodiment of the present disclosure, a flash atomization unit, which is provided with vortex atomizers, may be used. In such a known vortex atomizer, the water is set in swirling motion in a vortex chamber. The swirling water discharges via an outlet. It would be obvious that the thickness of the emerging film of water is only a fraction (for example 10%) of the diameter of the outlet passage. The subsequent flash size-reduction leads to droplets which (in dependence upon the pressure drop, the temperature and the diameter of the outlet) have an average size of 5 µm or less. On account of the reduced size of the water droplets, the risk of contact of the water droplets with the interior of the recirculation lines and components of the compressor is minimized.

It is clear that for implementing this size-reduction it is important that the conditions (especially the change of conditions), under which the water in the gaseous medium is atomized, are optimum for the size-reduction. Important conditions for the flash size-reduction are the temperature of the means of evaporation, the atomization pressure at which the water in the gaseous medium is atomized, and the diameter of the outlet passage. Therefore, the flash atomization unit may include means for adjusting the temperature of the means of evaporation and/or the atomization pressure.

As disclosed above, known nozzles or atomizers can be used in principle in the compression device according to the present disclosure. For creating a cooling mist, these nozzles can release the water in the cooling air in a direction which is either transverse or parallel to the flow of the cooling air.

According to an exemplary embodiment of the present disclosure, the cooling mist is created in a Venturi nozzle through which flows the air which is to be recirculated. Water is fed into the air at, or directly downstream of, the narrowest cross section of the Venturi nozzle. The water is entrained by the fast air flow and split into small drops in the process.

According to an exemplary embodiment of the present disclosure, the recirculated air, which is supersaturated or partially saturated with water droplets, is introduced into the compressor flow through at least one stator blade.

According to an exemplary embodiment of the present disclosure, the water and recirculated air are introduced separately into at least one stator blade and mixed to form a cooling mist in this stator blade. This cooling mist is introduced into the compressor flow from the blade. For implementing the method, the stator blade may be made hollow or constructed with guide passages for water and air. The water passage may open into the air passage via a nozzle. In the simplest case a hole, for example, a constriction in the outlet opening of the water passage with a circular cross section, can be provided as the nozzle.

According to an exemplary embodiment of the present disclosure, water and recirculated air are introduced into at least one stator blade of the compressor and from this introduced into the compressor flow through openings, which are disposed one after the other in the flow direction, and mixed on the blade surface for the creation of a cooling mist. To this end, for example, water from the blade surface is injected in the flow direction and, downstream of the water injection, the recirculated cooling air is introduced into the compressor main flow from the blade profile through an opening. The distance between the location of the water injection and the opening for the air recirculation is, for example, less than 30% of the chord length of the blade profile, such as less than 10% of the chord length of the blade profile.

Both as a result of water injection into the compressor and as a result of cooling air recirculation into the compressor, the pressure build-up in the compressor is shifted. The water injection leads to an intercooling effect which reduces the volumetric flow and leads to a shift of the pressure build-up in the direction of the compressor exit. The cooling air recirculation inherently leads to an increase of the volumetric flow in the compressor and therefore to a higher pressure build-up in the region upstream of the cooling air recirculation. Both effects taken individually have a negative influence upon the reliable operation of the compressor since a shift of the pressure build-up reduces the safety margin against compressor surge and, for example, can lead to a compressor surge in the case of an under-frequency event.

According to an exemplary embodiment of the present disclosure, the ratio of added water and recirculated air is controlled so that a shift of the pressure build-up in the compressor as a result of the intercooling effect of the injected water is at least partially compensated by the feed of recirculated cooling air. For example, the injected volume of water is selected so that the pressure change as a result of water injection is reduced by half, or even completely compensated, by the simultaneous cooling air recirculation at the most critical stage. Furthermore, provision can be made for a control element, for example, a control valve or a flap for controlling the recirculated cooling air flow, which controls the recirculated cooling air flow in dependence upon the injected volume of water. The cooling flow may increase with increasing injected volume of water, for example, it is proportional to the injected volume of water. Alternatively, boosters for controlling the cooling air flows can also be used. A minimum cooling air flow is advantageously ensured. A minimum cooling air flow can be realized, for example, by a valve or a flap with a minimum opening, or by a bypass with a throttle or restrictor around the control element.

The water injection may be used for covering peak loads. An increase of the recirculated cooling air flow, which increases with water injection or is proportional thereto, leads to improved cooling of the hot gas parts. Furthermore, water injection at constant hot gas temperature leads to a NOx reduction. The combination of water injection and increased recirculated cooling air flow therefore allows an increase of the hot gas temperature, which in turn leads to a further increase in output. For a peak-load operation, therefore, the combination of water injection with increased recirculated cooling air flow and increased hot gas temperature is provided. The hot gas temperature and the cooling air flow can be controlled as functions of the injected volume of water, for example. In another example, the cooling air flow and the injected volume of water are controlled as functions of the hot gas temperature. Furthermore, controlling of the hot gas temperature and of the injected volume of water is carried out as a function of the volume of cooling air. These functions are generally constantly increasing.

In order to ensure that the added water in the compressor evaporates and leads to the desired intercooling effect, according to an exemplary embodiment of the present disclosure, the compressor air, after the feed of the cooling air which is supersaturated with water droplets (cooling mist), is additionally further compressed in at least two compressor stages before it is fed to a combustion chamber.

An exemplary embodiment of the present disclosure provides that a portion of the cooling air for film cooling is fed into the turbine flow through film cooling holes which are arranged on the components. For example, the blades of the turbine are cooled by means of the cooling air, wherein film cooling holes are arranged on the blade leading edges and/or on the blade trailing edges. As a result of this, with a low loss of cooling air the thermally particularly heavily loaded edges of the blade are effectively film-cooled. A small portion of the cooling air, for example, less than 50% of the air which is introduced into the blade, may be used for film cooling.

An exemplary embodiment of the present disclosure provides a gas turbine plant for implementing the method according to the present disclosure. The gas turbine plant includes at least one compressor, which on the inlet side sucks in intake air and compresses it to form compressor exit air available on the discharge side, at least one combustion chamber, in which by utilizing the compressor exit air a fuel is combusted, forming hot gas, and at least one turbine, in which the hot gas is expanded, performing work. For cooling the thermally loaded components of the combustion chamber and/or of the turbine, provision is made for first cooling lines from the compressor and/or from the exit of the compressor to the thermally loaded components, and second cooling lines back to the compressor. Furthermore, the gas turbine according to the present disclosure includes first coolers in the first cooling lines, for recooling the cooling air, second coolers in the second cooling lines and, downstream of the second cooler, an injection arrangement for introducing water into the recirculated cooling air.

According to an exemplary embodiment of the present disclosure, provision is made in the second cooling air line for a plenum and a high-pressure nozzle for injecting water into the plenum, by means of which a cooling mist can be created during operation of the gas turbine plant.

According to an exemplary embodiment of the gas turbine plant, arrangement is made in the second cooling air line for a Venturi nozzle, into the narrowest cross section of which a water feed line leads, so that during operation of the gas turbine plant a cooling mist having fine drops of water can be created in the cooling air.

In accordance with an exemplary embodiment of the gas turbine plant, the compressor includes at least one stator blade which has at least one passage for the recirculation of cooling air, which through a blade root, a blade airfoil and an opening leads into the flow passage of the compressor.

In accordance with an exemplary embodiment, in order to prevent large secondary drops forming in the recirculation lines, for example, in the region of a change of direction of the passages in the compressor blades, which can lead to erosion on the subsequent blades, a stator blade is provided. The stator blade includes at least one water feed line which leads through the blade airfoil and in the installed state opens into the flow passage upstream or downstream of the opening for the recirculation of the cooling air.

In order to realize an effective mixing of the recirculated cooling air with the main flow in the compressor, in accordance with an exemplary embodiment of the flow passage, upstream of the compressor stator blade row through which cooling air is recirculated, is widened, and, downstream of this compressor stator blade row, is made smaller. The resulting changes in the flow passage cross section lead to additional flow accelerations which promote mixing. Moreover, as a result of the changes in the flow passage cross section, the disturbance of the main flow as a result of the introduced volumetric flow of recirculated cooling air can be minimized. Upstream or downstream of the compressor stator blade means, for example, the region between the location of the cooling air introduction and the respectively narrowest cross section of the preceding or following rotor blade.

Additional features of the exemplary embodiments are described in more detail below.

All the explained advantages are applicable not only in the respectively disclosed combinations but also in other combinations or in isolation without departing from the scope of the present disclosure. For example, the method can also be used for a gas turbine with sequential combustion. Accordingly, a gas turbine plant with sequential combustion and cooling air recirculation is also a subject of the present disclosure.

Figure 1:
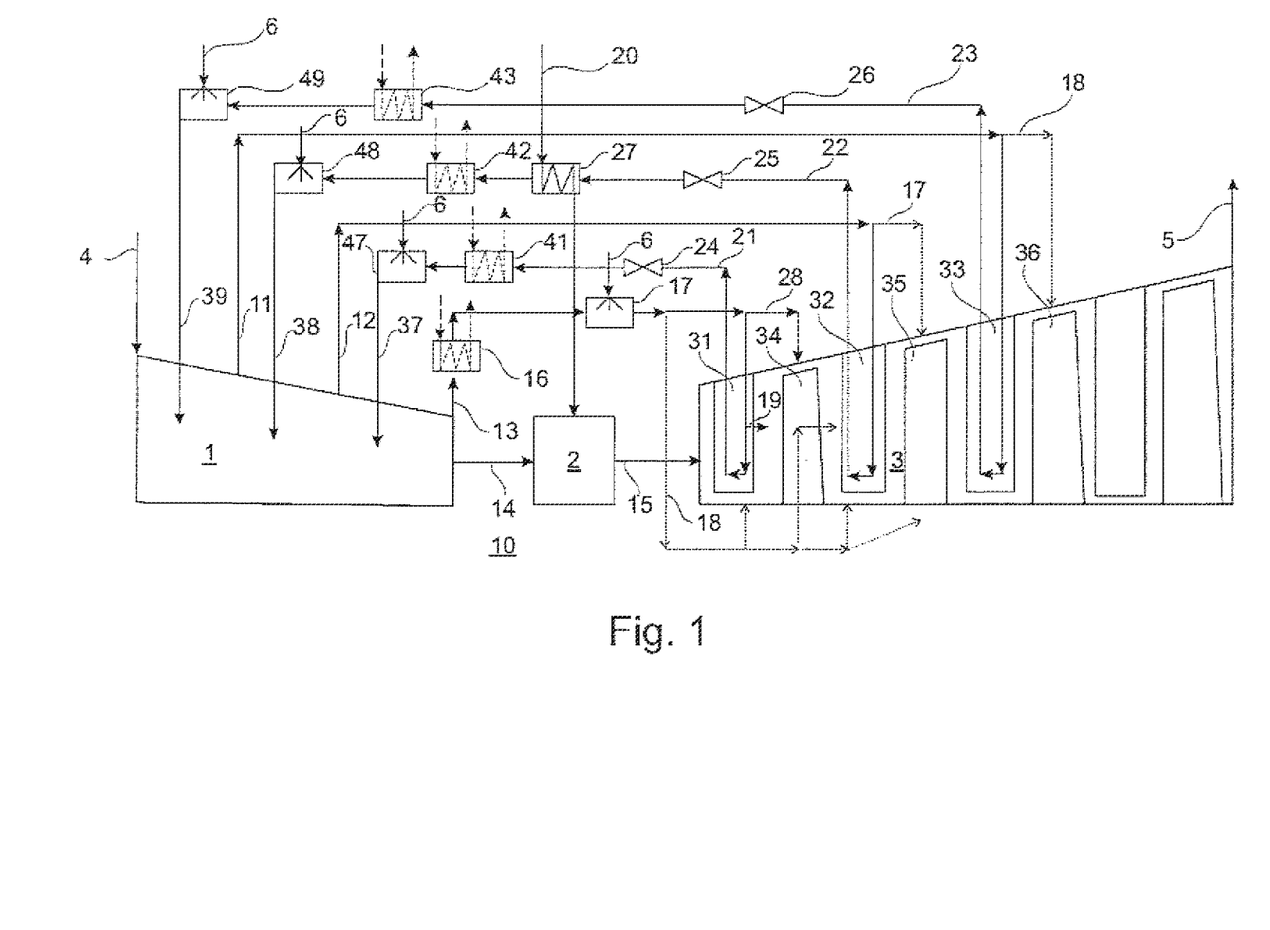
FIG. 1 shows a simplified schematic arrangement of a gas turbine plant according to an exemplary embodiment of the present disclosure with alternative cooling circuits with recooling for the cooling of blades in the turbine and water injection in plena of the recirculation lines.

FIG. 1 illustrates a simplified schematic arrangement of a gas turbine plant according to an exemplary embodiment of the present disclosure with three separate cooling circuits for three turbine stator blades. The gas turbine plant 10 includes a multistage compressor 1, a combustion chamber 2 and a multistage turbine 3. The compressor 1 and the turbine 3 have corresponding blade rows which are arranged on a common rotor. The compressor 1 sucks in intake air 4 on the inlet side, compresses it, and on the exit side discharges it in the form of compressor exit air 14 to the combustion chamber 2 where it is used as combustion air for combusting a (liquid or gaseous) fuel 20. The hot gas 15 which results during the combustion is expanded in the subsequent turbine 3, performing work, and is finally transferred as exhaust gas 5 to an exhaust stack, or, in the case of a combined cycle power plant, to a downstream heat recovery steam generator.

Different rows of stator blades 31, 32, 33 and rotor blades 34, 35, 36, which are exposed to the hot gas 15 coming from the combustion chamber 2, are located in the turbine 3, enclosed by a hot gas casing, wherein the thermal loading of the blades and casing parts or of the walls of the transition pieces is greater the closer they are placed to the inlet of the turbine 3. These thermally heavily loaded components must be cooled in order to achieve an adequate service life at the high hot gas temperatures which are required for good efficiency.

According to an exemplary embodiment of the present disclosure, the thermally loaded components are now cooled with cooling air which is extracted from the compressor 1 at a predetermined pressure level, directed via first cooling lines 11, 12, 13 to the components which are to be cooled, used for cooling there, and then for the most part recirculated via second cooling lines 21, 22, 23 to the compressor 1 and fed again there at a lower pressure level. As a result of this type of refeeding, the compressor 1 can compensate the pressure loss which occurs during the cooling process. The cooling air therefore participates for the most part in the combustion process as combustion air and therefore leads to low output losses. The cooling of the thermally loaded components is predominantly an internal cooling, during which the cooling air flows through cooling passages which are provided inside the components. A largely closed cooling circuit is thus created.

The cooling circuit of the stator blades and rotor blades can be closed, as is shown for the second and third stator blades 32, 33. The cooling circuit, however, does not have to be completely closed. Rather, it is possible for the provision of additional external cooling in the form of film cooling 19, as is shown for the first stator blade 31. For this purpose, discharge openings (film cooling holes) are arranged on the component to be cooled, through which discharge openings a small portion of the circulating cooling air flows to the outside as film cooling air 19 and forms a cooling film on the hot gas-loaded external surface of the component. The proportion of leakage air and film cooling air 19 is selected in this case so that on the one hand the overall efficiency of the plant is only slightly reduced, but on the other hand an effective film cooling ensues. The rotor cooling, shown in outline, is effected by means of the rotor cooling air 18 with an open cooling system. Without limitation, a closed or partially closed system with one pressure stage, or a plurality of pressure stages, can also be constructed in this case.

Shown in the example of FIG. 1 are three cooling circuits 11, 12, 13 and 21, 22, 23, which, depending upon requirement, extract cooling air at different pressure levels of the compressor 1 and after re-cooling re-feed the cooling air. The heat which is absorbed by the cooling air during the cooling process can be removed from the cooling air into the compressor 1 before the re-feeding of the cooling air by a cooler 41, 42 or 43 being arranged in each case in the second cooling lines 21, 22, 23. The heat is advantageously put to further use in a thermal power process. As cooling medium in the coolers 41, 42, 43, for example, water or steam comes into consideration in this case. Additionally or alternatively to this re-cooling, it is possible to cool the compressed air to a lower temperature by means of a cooling-air cooler 16 after extraction from the compressor 1 before it is used for the cooling of thermally loaded components. In the example, this is shown only for the high-pressure cooling air which is discharged from the compressor exit via a first cooling line 13 and is used for cooling the first stator row 31. In the example, the high-pressure cooling air, moreover, is further cooled by injecting water 6 into a spray cooler 17 before it is fed to the stator blades 31 for cooling.

The re-cooling of the cooling air after heat absorption in the stator blades 31, 32, 33 by means of the coolers 41, 42, 43 can be used at the same time for lowering the temperature of the air compressed in the compressor 1 in the manner of an intercooler. To this end, the appreciably greater (e.g., more) heat is withdrawn from the cooling air in the coolers 41, 42, 43 than the cooling air absorbs during the cooling process in the stator blades 31, 32, 33 and due to recompression. As a result of this, the compressor exit temperature, for example, the temperature of the compressor exit air 14, can be lowered, which results in a reduction of the compressor effort and therefore in an increase of the output and of the efficiency of the gas turbine. Furthermore, this can enable an increase of the pressure ratio, which also leads to an increase of the output and of the efficiency.

For further lowering of the temperature of the cooling air in the second cooling lines 21, 22, 23, spray coolers 47, 48, 49 are additionally arranged. In addition to cooling, these spray coolers allow water 6 to be injected into the cooling air up to a supersaturation level and so allow the creation of a cooling mist 37, 38, 39 which is recirculated into the compressor 1 at the corresponding pressure stages. The cooling mist 37, 38, 39 leads to an intercooling both as a result of mixing with the compressor main flow and due to the resulting evaporation of the small water droplets introduced in the compressor 1. This leads to a further significant reduction of the compressor effort and to the above-described advantages associated therewith regard to output and efficiency of the gas turbine.

A portion of the cooling air, as shown here based on the example of the high-pressure cooling air, can also be tapped from the first cooling lines 11, 12, 13 and be used for the cooling of thermally loaded components in an open cooling system 28.

In order to control the cooling air flows in dependence upon the required cooling capacity, cooling-air control elements 24, 25, 26 are provided in the cooling circuits. In the depicted example, the cooling-air control elements 24, 25, 26 are arranged in the second cooling lines 21, 22, 23. They can equally be arranged in the first cooling lines 11, 12, 13. The cooling-air control elements 24, 25, 26 also allow the cooling air volume which is recirculated into the compressor to be controlled as a function of the cooling capacity and of the injected volume of water in order to therefore optimize the pressure build-up in the compressor, or to distribute the pressure build-up so that for each operating state an adequate margin against compressor surge is ensured.

Based on the basic schematic diagram of the cooling system according to the present disclosure which is shown in FIG. 1, different variants, which are specific to different application cases and have their particular advantages, can be realized within the scope of the present disclosure. For example, a spray cooler can be used only in one of the cooling air circuits. Furthermore, instead of separate cooling circuits for the individual turbine stages, one cooling circuit in which the turbine stages are cooled sequentially by the cooling air can be realized. In this case, for example, the heated cooling air which discharges from the first stator blade 31 is at least partially directed into the second stator blade 32 and additionally into the third stator blade 33 for the cooling thereof. In this case, recirculation of the cooling air between the stages is possible in each case. The cooling air is advantageously first of all directed through the respective stage with the highest pressure on the hot gas side in order to ensure that a positive pressure drop between the cooling air and the hot gases exists so that hot gas infiltration into the cooling system is reliably prevented even in the case of a leakage.

Additionally shown in FIG. 1 is how the fuel 20 is preheated in a fuel preheater 27 by means of exchange of heat with the recirculated cooling air, as a result of which the efficiency of the gas turbine is also increased.

Within the scope of the present disclosure in a gas turbine plant 1, instead of, or in addition to, the blades of the turbine 3, other thermally heavily loaded components of the plant are also to be cooled with air in the closed circuit. Thus, cooling of the walls of the combustion chamber 2 or cooling of the combustion chamber liners and the hot gas casing of the turbine 3 can advantageously be carried out by means of internal cooling air circulation.

Figure 3A:
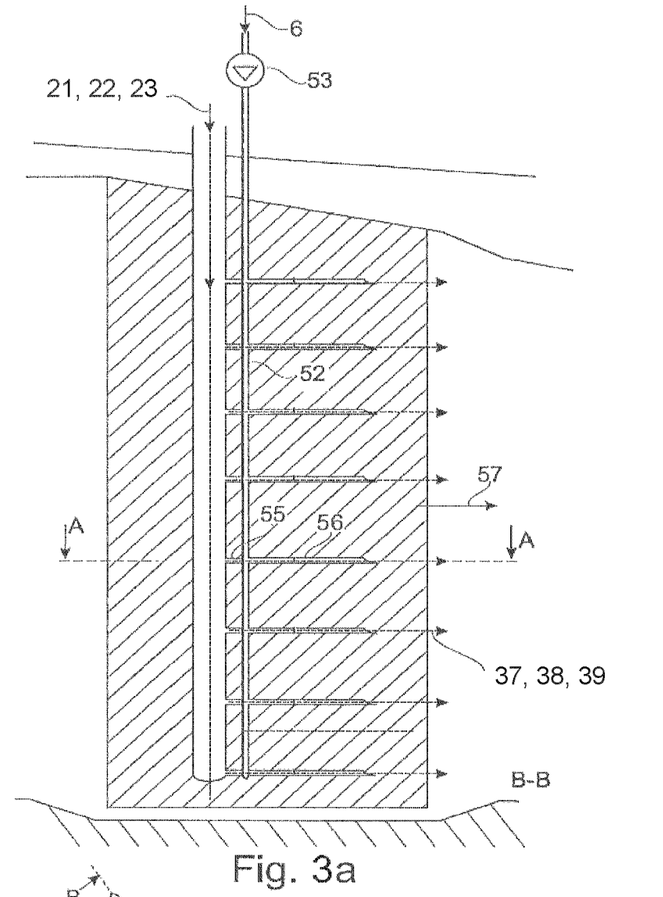
FIGS. 3a and 3b schematically show an exemplary compressor blade with separate passages for the introduction of recirculated air and water through separate openings.
Figure 3B:
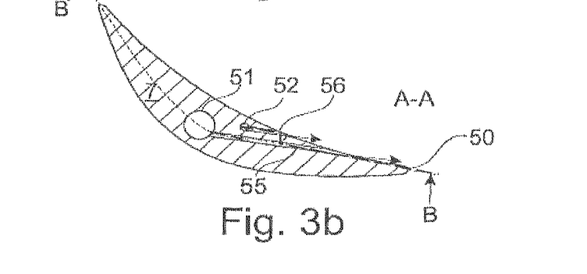
Figure 4A:
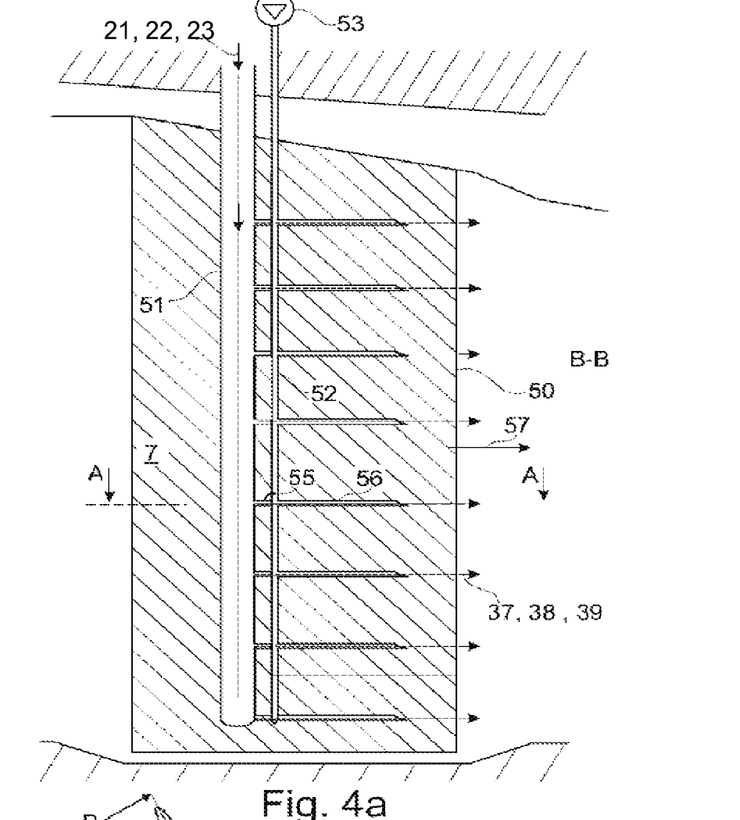
FIGS. 4a and 4b schematically show an exemplary compressor blade with separate passages for the introduction of recirculated air and water through a common discharge opening.
Figure 4B:
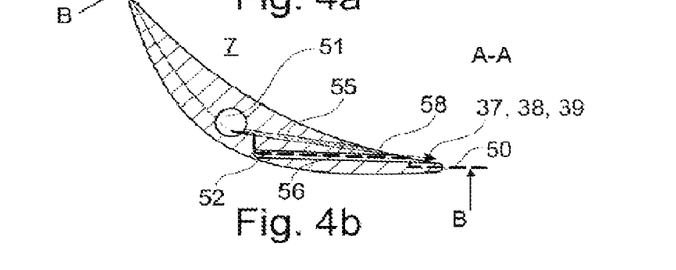

In addition to water injection in a spray cooler 47, 48, 49, different advantageous water feed lines into the recirculated cooling air are conceivable as alternatives to spray coolers 47, 48, 49. Examples of embodiments in which a cooling mist is created in, or on, the compressor stator blades 7 or their feed lines are shown in FIGS. 2 to 4.

Figure 2A:
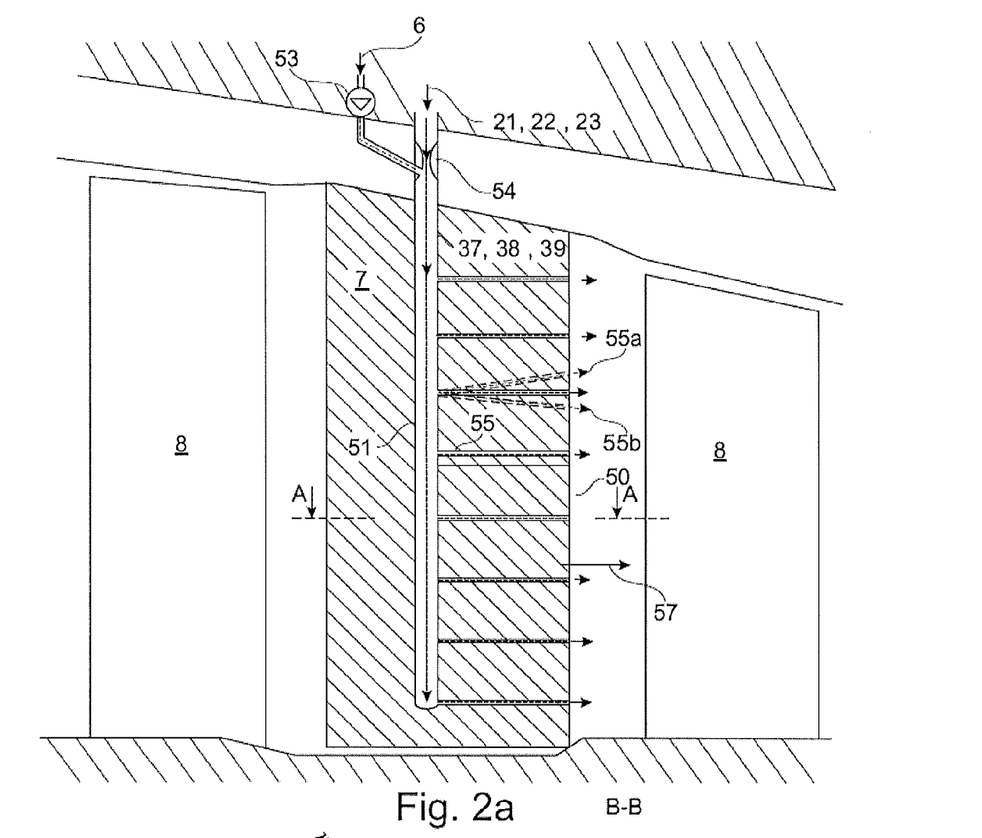
FIG. 2 schematically shows an exemplary compressor blade with passages for the introduction of drop-laden cooling air through the blade into the flow passage of the compressor.
Figure 2B:
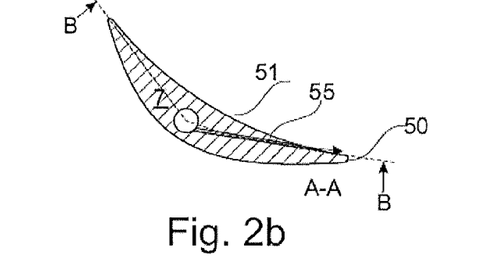

FIG. 2*a* schematically shows the longitudinal section of an exemplary compressor stator blade 7 in a detail of the compressor passage. The compressor stator blade 7 includes at least one recirculation passage 51 which extends inside the blade airfoil basically in the longitudinal axis of the blade, and also at least one discharge passage 55 which extends from the recirculation passage 51 in the direction of the blade trailing edge 50. A section A-A through the blade profile is shown schematically in FIG. 2*b*. The recirculation passage 51 may be arranged in the region with the largest profile thickness of the blade profile. In the depicted example, the cooling mist 37, 38, 39 is introduced into the main flow through the discharge passages 55 via the blade trailing edge. The discharge passages can extend parallel to the main flow direction 57 or can extend at an angle, as is shown by the discharge passages 55*a* and 55*b*. As a result of the introduction at an angle, the mixing of the drops of water with the compressor air can be improved depending upon the compressor flow and the atomization.

In FIG. 2*a*, a further example of the creation of the cooling mist 37, 38, 39 is shown. This is created in this case in a Venturi nozzle 54 upstream of the blade profile by the recirculated cooling air being accelerated in the Venturi nozzle 54 and by water 6 being added in the narrowest cross section of the nozzle. The water atomization can optionally be assisted by pressure atomization, for which a high-pressure pump 53 is arranged in the water feed line.

In the depicted example, the cooling mist 37, 38, 39 is introduced into the main flow through the discharge passages 55 via the blade trailing edge. An introduction can also be advantageous, however, before reaching the blade trailing edge 50, in order to delay a boundary layer separation, for example.

Without limitation, this blade arrangement can also be operated without a Venturi nozzle, wherein it is connected to a spray cooler, for example.

FIG. 3*a* schematically shows the longitudinal section of an exemplary compressor stator blade 7. The compressor stator blade 7 also includes at least one recirculation passage 51, extending basically in the longitudinal direction of the blade, and at least one discharge passage 55, extending from the recirculation passage 51 in the direction of the blade trailing edge 50. This blade additionally has a water feed line which comprises a water passage 52, extending basically in the longitudinal direction of the blade, and at least one injection passage 56, extending from the water passage 52 in the direction of the blade trailing edge 50. By means of the water passage 52, water can be introduced via the injection passages 56 into the main flow, the water being mixed with the recirculated cooling air which is introduced downstream thereof and initially forming a cooling mist 37, 38, 39 in the compressor, which leads to intercooling in the compressor as a result of evaporation.

A section A-A through the blade profile is shown schematically in FIG. 3*b*. The recirculation passage 51 may be arranged in the region with the largest profile thickness of the blade profile. Arranged parallel to the recirculation passage is a water passage 52 from which extend injection passages in the direction of the blade trailing edge 50. These injection passages open onto the pressure-side blade surface before reaching the blade trailing edge 50.

FIG. 4*a* schematically shows the longitudinal section of an exemplary compressor stator blade 7. This stator blade 7 differs from the example from FIG. 3 by the fact that the discharge passage 55 and the injection passage 56 lead to a common opening on the blade surface and therefore an intensive mixing of water and recirculated cooling air to form a cooling mist takes place when being introduced into the main flow.

The common leading of the discharge passage 55 and injection passage 56 to the discharge opening 58 on the blade surface can be seen better in the section A-A through the blade profile shown schematically in FIG. 4*b*.

In the examples shown in FIGS. 3*a* and 4*a*, the recirculation passages 51 and the water passages 52 are shown in the longitudinal direction of the blade in each case, and the discharge passages 55 and the injection passages 56 are shown parallel to the main flow direction 57 in each case. These passages, for construction-related reasons, for example, may extend at angles. Injection at an angle to the compressor main flow direction 57 can especially be advantageous for a better mixing. The discharge openings of the discharge passage 55 and the injection passage 56 may be constructed in pairs in each case and arranged at the same height on the blade profile.

By implementing the exemplary embodiments of the present disclosure, the overall result is an effective cooling of the thermally loaded components of a gas turbine plant, which can be simply operated, can be used in a flexible manner and allows an increase of output and efficiency of the plant.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 Compressor
2 Combustion chamber
3 Turbine
4 Intake air
5 Exhaust gas
6 Water
7 Compressor stator blade
8 Compressor rotor blade
10 Gas turbine plant
11, 12, 13 First cooling line
14 Compressor exit air
15 Hot gas
16 Cooling-air cooler
17 Spray cooler
18 Rotor cooling air
19 Film cooling
20 Fuel
21, 22, 23 Second cooling line
24, 25, 26 Cooling-air control element
27 Fuel preheater
28 Open cooling system
31 First stator blade
32 Second stator blade
33 Third stator blade
34 First rotor blade
35 Second rotor blade
36 Third rotor blade
37, 38, 39 Cooling mist
41, 42, 43 Heat exchanger
47, 48, 49 Spray cooler
50 Blade trailing edge
51 Recirculation passage
52 Water passage
53 High-pressure pump
54 Venturi nozzle
55, 55a, 55b Discharge passage
56 Injection passage
57 Compressor main flow direction
58 Discharge opening

What is claimed is:

1. A gas turbine plant, comprising:
a compressor configured to suck in intake air on an inlet side of the compressor, compress the air to form compressed air and discharge the compressed air on a discharge side of the compressor;
a combustion chamber configured to combust the compressed air to form a hot gas;
at least one turbine configured to expand the hot gas to perform work;
first cooling lines configured to cool thermally loaded components of at least one of the combustion chamber and the turbine by recirculating cooling air to the thermally loaded components, the first cooling lines being connected from an exit of the compressor to the thermally loaded components;
second cooling lines connected from the thermally loaded components back to the compressor;
at least one of a first cooler arranged in the first cooling lines and a second cooler arranged in the second cooling lines; and
an injection arrangement configured to introduce water into the recirculated cooling air,
wherein the compressor comprises at least one stator blade which has at least one passage for the recirculation of cooling air, which leads through a blade airfoil and comprises at least one opening into a flow passage of the compressor, and
wherein the at least one stator blade comprises at least one second water feed line which leads through the blade airfoil and in the blade opens into at least one discharge passage for the recirculation of cooling air.

2. A gas turbine plant, comprising:
a compressor configured to suck in intake air on an inlet side of the compressor, compress the air to form compressed air and discharge the compressed air on a discharge side of the compressor;
a combustion chamber configured to combust the compressed air to form a hot gas;
at least one turbine configured to expand the hot gas to perform work;
first cooling lines configured to cool thermally loaded components of at least one of the combustion chamber and the turbine by recirculating cooling air to the thermally loaded components, the first cooling lines being connected from an exit of the compressor to the thermally loaded components;
second cooling lines connected from the thermally loaded components back to the compressor;
at least one of a first cooler arranged in the first cooling lines and a second cooler arranged in the second cooling lines; and
an injection arrangement configured to introduce water into the recirculated cooling air,
wherein the compressor comprises at least one stator blade which has at least one passage for the recirculation of cooling air, which leads through a blade airfoil and comprises at least one opening into a flow passage of the compressor, and
wherein the at least one stator blade comprises
at least one first water feed line which leads through the blade airfoil and opens into the flow passage upstream or downstream of the at least one opening for the recirculation of cooling air.

3. The gas turbine plant as claimed in claim 2, wherein the second cooling line comprises a spray cooler having a plenum and a nozzle for injecting water into the plenum to create a cooling mist during operation.

4. The gas turbine plant as claimed in claim 2, wherein the second cooling line comprises a Venturi nozzle into which leads the at least one first water feed line.

5. The gas turbine plant as claimed in claim 2, wherein the flow passage of the compressor is widened in flow direction upstream of a row of stator blades of the compressor through which the cooling air is recirculated.

6. The gas turbine plant as claimed in claim 1, wherein the nozzle is a high-pressure nozzle.

7. The gas turbine plant as claimed in claim 2, wherein the flow passage of the compressor is made smaller downstream of a row of a stator blade of the compressor.

8. The gas turbine plant as claimed in claim 3, wherein the cooling mist comprises cooling air supersaturated with water droplets.

9. A gas turbine plant, comprising:
a compressor configured to suck in intake air on an inlet side of the compressor, compress the air to form compressed air and discharge the compressed air on a discharge side of the compressor;
a combustion chamber configured to combust the compressed air to form a hot gas;

at least one turbine configured to expand the hot gas to perform work;

first cooling lines configured to cool thermally loaded components of at least one of the combustion chamber and the turbine by recirculating cooling air to the thermally loaded components, the first cooling lines being connected from an exit of the compressor to the thermally loaded components;

second cooling lines connected from the thermally loaded components back to the compressor;

at least one of a first cooler arranged in the first cooling lines and a second cooler arranged in the second cooling lines; and an injection arrangement configured to introduce water into the recirculated cooling air, wherein the compressor comprises at least one stator blade, which includes at least one opening for the recirculation of cooling air into a flow passage of the compressor and at least one water feed line which leads through the blade airfoil and opens, within the at least one stator blade, into a flow passage for recirculation air upstream or downstream of the at least one opening for the recirculation of cooling air, wherein the at least one stator blade includes a pressure-side blade surface and a blade trailing edge, and wherein the flow passage for recirculation air opens onto the pressure-side blade surface before reaching the blade trailing edge.

10. A gas turbine plant, comprising:

a compressor configured to suck in intake air on an inlet side of the compressor, compress the air to form compressed air and discharge the compressed air on a discharge side of the compressor;

a combustion chamber configured to combust the compressed air to form a hot gas;

at least one turbine configured to expand the hot gas to perform work;

first cooling lines configured to cool thermally loaded components of at least one of the combustion chamber and the turbine by recirculating cooling air to the thermally loaded components, the first cooling lines being connected from an exit of the compressor to the thermally loaded components;

second cooling lines connected from the thermally loaded components back to the compressor;

at least one of a first cooler arranged in the first cooling lines and a second cooler arranged in the second cooling lines; and an injection arrangement configured to introduce water into the recirculated cooling air, wherein the second cooling lines comprise a spray cooler having a plenum and a nozzle for injecting water into the plenum to create a cooling mist during operation, wherein the cooling mist comprises cooling air supersaturated with water droplets, and wherein the compressor comprises at least one stator blade having at least one discharge passage for recirculated cooling air, a pressure-side blade surface, and a blade trailing edge, the at least one discharge passage ending before the blade trailing edge; and wherein the at least one stator blade further comprises at least one water feed line which leads through the blade airfoil.

* * * * *